United States Patent [19]

Cox et al.

[11] 4,199,027
[45] Apr. 22, 1980

[54] OIL RECOVERY PROCESS

[75] Inventors: Terence Cox; Roger I. Hancock, both of Middlesbrough, England

[73] Assignee: Imperial Chemical Industries Limited, London, England

[21] Appl. No.: 877,738

[22] Filed: Feb. 14, 1978

[30] Foreign Application Priority Data

Feb. 28, 1977 [GB] United Kingdom ............... 8270/77

[51] Int. Cl.$^2$ ............................................. E21B 43/22
[52] U.S. Cl. .............................. 166/274; 252/8.55 D
[58] Field of Search ................. 252/8.55 D; 166/274, 166/275

[56] References Cited

U.S. PATENT DOCUMENTS

| | | | |
|---|---|---|---|
| 3,500,923 | 3/1970 | Reisberg | 252/8.55 X |
| 3,888,308 | 6/1975 | Gale et al. | 252/8.55 X |
| 3,946,812 | 3/1976 | Gale et al. | 166/274 |
| 4,017,405 | 4/1977 | Holm | 252/8.55 |

Primary Examiner—Herbert B. Guynn
Attorney, Agent, or Firm—Cushman, Darby & Cushman

[57] ABSTRACT

A thickener and surfactant for a driving fluid used in enhanced oil recovery comprises a salt of a sulphated polyoxyethylene alcohol in which at least 40 wt % of the alcohol portion of the sulphated polyoxyethylene alcohol is a $C_8$ to $C_{20}$ primary alcohol having a $C_1$ to $C_3$ alkyl substituent in the 2-position of an otherwise linear chain. The balance of the alcohol portion may be made up of a linear primary alcohol of same carbon number as the 2-alkyl branched alcohol.

5 Claims, 1 Drawing Figure

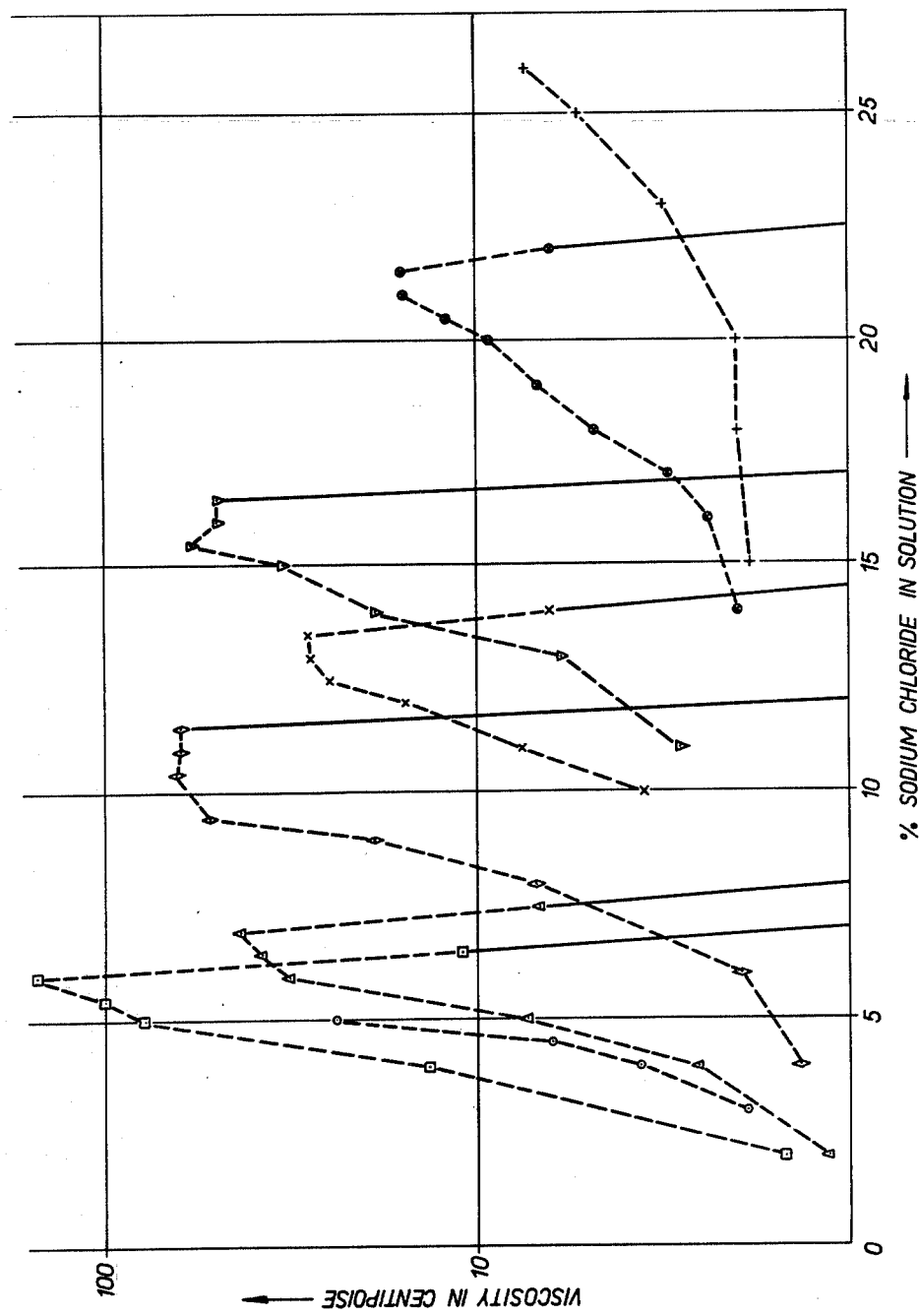

OIL RECOVERY PROCESS

The present invention relates to the recovery of oil from a subterranean oil formation.

The recovery of oil from a subterranean oil formation may be divided into stages. In the first stage, known as primary oil recovery, the oil is forced out by natural flow, gas lifting, gas repressurisation or by pumping methods. When the ability of these methods to recover the oil is exhausted there still remains a considerable quantity of oil in the formation and in order to recover some of this oil alternative recovery techniques may be brought into play in the secondary oil recovery stage.

The secondary oil recovery techniques may vary in detail but broadly most involve "water-flooding" the formation in order to force the oil towards the producing well or wells. The main difficulty with this technique arises from the location of the oil which is usually in small pores and capillaries of the formation where it tends to adhere to the rock and from which by reason of the high interfacial tension between the water and the oil it is difficult to displace. One method of enhancing the water flooding process is to contact the oil with a surfactant composition in front of the water-flood as the interfacial tension between the surfactant solution and the oil is much less than between water and the oil so that the latter is now more readily displaced. Sulphated polyoxyethylene alcohols are included among the surfactants which have been suggested for this purpose.

An alternative technique is to first introduce to the formation a fluid which is miscible with both oil and water, a displacing fluid, which improves the effectiveness of the overall process but which frequently possesses the disadvantage of "fingering". "Fingering" is a phenomenon which arises as a result of a difference in viscosity between the displacing fluid, which is usually mobile, and the oil, so that the fluid instead of pushing the oil before it tends to penetrate into the oil front in the form of "fingers" which can result in some of the oil being bypassed. This disadvantage may be overcome to a large extent by use of a thickened "driving fluid" which pushes the displacing fluid through the formation, it in its turn being driven by the water-flood. A number of thickening agents have been suggested for use in the driving fluid and among these either alone or in conjunction with other additives there have been proposed sulphated polyoxyethylene alcohols which in this application are used primarily for their thickening and not for their surfactant action.

We have now found that in enhanced oil recovery operations of the type described the effectiveness of a sulphated polyoxyethylene alcohol may be improved particularly as a thickener by careful selection of the structure of the alcohol portion of the molecule.

According to the invention therefore a process for the recovery of oil from a subterranean formation comprises the step of treating the formation with a salt of a sulphated polyoxyethylene alcohol in which at least 40% by weight of the alcohol portion of the sulphated polyoxyethylene alcohol is a $C_8$ to $C_{20}$ preferably $C_{10}$ to $C_{16}$, primary alcohol having a $C_1$ to $C_3$ alkyl substituent in the 2-position of an otherwise linear chain.

The 2-($C_1$ to $C_3$)-alkyl branched alcohol may comprise 40 to 90% by weight of the alcohol portion of the sulphated polyoxyethylene alcohol particularly 45 to 80% by weight. The balance of the alcohol portion suitably comprises a linear primary alcohol which is preferably 5 to 55 wt % of the alcohol portion and generally of same carbon number as the 2-($C_1$ to $C_3$)-alkyl branched chain alcohol. Mixtures of alcohols which may be ethoxylated and sulphated to make the sulphates used in the process of the invention may be made by carbonylation of a linear alpha-olefine or mixture of linear alpha-olefines so that a product is obtained which contains, for example, 50% by weight linear alcohol and 45% by weight 2-($C_1$ to $C_3$)-alkyl branched primary alcohol, the remaining 5 wt % being 2-($>C_3$)-alkyl branched alcohol. In particular the linear alpha-olefines may be a mixture of $C_{12}$ and $C_{14}$ alpha-olefines which give a mixture of linear and 2-($C_1$ to $C_3$)-alkyl branched $C_{13}$ and $C_{15}$ alcohols (50% by weight linear 45% by weight 2-($C_1$ to $C_3$)-alkyl branched, 67% by weight $C_{13}$ and 33% by weight $C_{15}$). If desired, the mixture obtained by the carbonylation process may be further refined by distilling out some of the linear alcohol to increase the proportion of 2-($C_1$ to $C_3$)-alkyl branched chain alcohol in the mixture e.g. so that it contains up to 50 to 60% by weight branched chain product, the balance including 37 to 27 wt % linear alcohol. The $C_1$ to $C_3$ alkyl substituent in the 2-($C_1$ to $C_3$)-alkyl branched alcohol generally comprises a mixture of methyl, ethyl and propyl groups, the methyl group predominating.

The sulphated polyoxyethylene alcohol has the general formula $(RO\text{-}(CH_2CH_2O)_{\overline{n}}SO_3)_mX$ where n indicates an average value and is an integer lying in the range 1 to 50 preferably 1 to 10, X is an alkali metal cation preferably sodium, an alkaline earth metal cation eg calcium, magnesium, a higher valent metal cation eg aluminium, or an ammonium or amine cation, R is an alkyl radical derived from the alcohol portion of the molecule and m is the valency of X. An amine cation may be derived from an aliphatic or aromatic mono-, di or poly-amine, preferably from a mono-, di- or poly-amine containing up to 20 carbon atoms eg stearylamine, ethylene diamine, hexamethylene diamine, diethylene triamine or triethylene pentamine.

The salt of the sulphated polyoxyethylene alcohol which is used in the process according to the invention may be used in an aqueous solution or dispersion in a concentration of up to 5% by weight. Clearly, it is desirable for cost reasons to use as little alcohol sulphate as possible and in general concentrations in the range 0.1 to 1.5% by weight are satisfactory.

It is one of the advantages of the sulphates of polyoxyethylene alcohols in general that they are effective in water of high ionic strength i.e. greater than 1% e.g. 5 to 10% by weight salinity and in the presence of calcium, magnesium and iron (ferric) ions. In addition to this advantage the polyoxyethylene alcohol sulphates used in the process of the present invention confer, as compared with their analogues derived from linear and other branched chain alcohols, an enhanced thickening of an aqueous solution and in comparison with the linear alcohol derivatives a greater resistance to shear stress i.e. the thickening effect has less tendency to diminish under the mechanical forces experienced as the composition is forced into the formation.

The process of the invention will now be further described with reference to the following Examples.

EXAMPLES 1 TO 9

In the following Examples the "thickening" property of a variety of surfactants was measured in a typical connate water derived from a Texas oilfield. This water which would be used in "water-flooding" contained approximately 70,000 ppm dissolved solids made up mainly of sodium and chloride ions with lesser amounts of calcium, magnesium, bicarbonate and sulphate ions. The total hardness of the water was 3,300 ppm. The "thickening" property of an additive in the connate water is reflected by its viscosity as measured over a range of shear conditions with a Brookfield viscometer. In the following measurements the temperature was approximately the temperature of the oil well with which the water was associated, i.e. 24.4° C. The additives tested, codenamed for convenience as A to I had the general formula $RCH_2O(CH_2CH_2O)_nSO_3X$ and were as follows:

| Additive | R—CH$_2$— | n(average) | X |
|---|---|---|---|
| A | 71% w/w of n-C$_{12}$H$_{25}$ and 25% w/w of n-C$_{14}$H$_{29}$ | 2.2 | Na |
| B | A mixture of linear C$_{12}$H$_{25}$— to C$_{15}$H$_{31}$— | 3 | Na |
| C | Mixture of C$_{12}$H$_{25}$ to C$_{15}$H$_{31}$ 43% straight chain, 34% 2-methyl, ethyl and propyl-branched 23% 2-butyl and higher alkyl-branched | 3 | Na |

| Additive | R | n(average) | X |
|---|---|---|---|
| D | C$_{13}$H$_{27}$ and C$_{15}$H$_{31}$ 50% straight chain, 45% 2-methyl, ethyl and propyl-branched | 2 | NH$_4$ |
| E | C$_{13}$H$_{27}$ and C$_{15}$H$_{31}$ 50% straight chain, 45% 2-methyl, ethyl and propyl-branched | 3 | NH$_4$ |
| F | C$_{13}$H$_{27}$ and C$_{15}$H$_{31}$ 50% straight chain, 45% 2-methyl, ethyl and propyl-branched | 2 | Hexmethylene-diamine |
| G | C$_{13}$H$_{27}$ and C$_{15}$H$_{31}$ 50% straight chain, 45% 2-methyl, ethyl and propyl-branched | 3 | Na |
| H | C$_{13}$H$_{27}$ and C$_{15}$H$_{31}$ . 37% straight chain, 50% 2-methyl, ethyl and propyl-branched 6% 2-butyl and higher alkyl-branched. | 3 | Na |
| I | C$_{13}$H$_{27}$ and C$_{15}$H$_{31}$ . 37% straight chain, 50% 2-methyl, ethyl and propyl-branched 6% 2-butyl and higher alkyl-branched. | 3 | NH$_4$ |

The viscosity measurements under varying conditions of shear are given in the following Table.

| Example | Additive | Concentration p.p.m | Viscosity (centipoise) at shear rate sec$^{-1}$ | | | | | |
|---|---|---|---|---|---|---|---|---|
| | | | 1.8 | 3.7 | 7.3 | 14.7 | 36.7 | 73.4 |
| 1 | A | 9451 | 9.4 | 5.6 | 4.5 | 3.5 | 3.0 | 2.7 |
| | | 4789 | 3.8 | 3.8 | 2.7 | 2.2 | 1.8 | 1.6 |
| | | 2473 | 4.0 | 3.0 | 2.3 | 1.9 | 1.6 | 1.5 |
| | | 1234 | 2.0 | 1.6 | 1.7 | 1.6 | 1.4 | 1.4 |
| 2 | B | 9371 | 5.8 | 5.8 | 5.0 | 4.9 | 4.8 | 4.8 |
| | | 4899 | — | — | 4.7 | 3.7 | 2.9 | 2.7 |
| | | 2410 | 4.0 | 2.4 | 2.3 | 2.1 | 1.7 | 1.7 |
| | | 1250 | 3.2 | 3.2 | 2.3 | 1.6 | 1.4 | 1.4 |
| 3 | C | 9452 | 5.6 | 5.3 | 5.1 | 4.9 | 4.8 | 4.9 |
| | | 4847 | 3.0 | 2.3 | 2.3 | 2.2 | 2.1 | 2.1 |
| | | 2489 | 1.8 | 1.7 | 1.6 | 1.5 | 1.4 | 1.4 |
| | | 1238 | 1.8 | 1.5 | 1.3 | 1.2 | 1.2 | 1.2 |
| 4 | D | 9350 | 154.2 | 148.7 | — | — | — | — |
| | | 4735 | 85.2 | 81.0 | 67.7 | 48.6 | — | — |
| | | 2373 | 12.8 | 12.2 | 11.2 | 9.6 | 7.6 | 6.2 |
| | | 1204 | 2.2 | 2.4 | 2.2 | 2.1 | 2.1 | 2.2 |
| 5 | E | 9594 | 100 | 95.8 | 89.9 | — | — | — |
| | | 4957 | 18.8 | 17.7 | 17.5 | 16.9 | 15.4 | — |
| | | 2352 | 2.4 | 2.4 | 2.4 | 2.4 | 2.3 | 2.3 |
| | | 1186 | 1.6 | 1.4 | 1.4 | 1.4 | 1.4 | 1.4 |
| 6 | F | 9572 | 8.2 | 7.9 | 6.7 | 6.3 | 6.6 | 7.5 |
| | | 4865 | 3.2 | 2.8 | 2.2 | 2.0 | 2.0 | 2.3 |
| | | 2514 | 2.4 | 2.3 | 2.0 | 1.8 | 1.8 | 1.9 |
| | | 1212 | 2.2 | 1.9 | 1.6 | 1.5 | 1.4 | 1.5 |
| 7 | G | 9279 | 7.0 | 6.3 | 6.1 | 5.8 | 4.7 | 5.7 |
| | | 4733 | 3.2 | 3.0 | 2.7 | 2.6 | 2.5 | 2.6 |
| | | 2393 | 2.2 | 2.0 | 1.9 | 1.8 | 1.7 | 1.7 |
| | | 1200 | 2.0 | 1.3 | 1.4 | 1.3 | 1.3 | 1.3 |
| 8 | H | 9055 | 14.0 | 14.0 | 14.0 | 14.0 | 13.7 | — |
| | | 4568 | 4.2 | 4.1 | 4.1 | 4.1 | 4.0 | 4.1 |
| | | 1664 | 1.6 | 1.6 | 1.6 | 1.6 | 1.6 | 1.6 |
| | | 1166 | 2.0 | 1.7 | 1.6 | 1.5 | 1.4 | 1.4 |
| 9 | I | 9296 | 11.4 | 10.8 | 10.8 | 10.7 | 10.5 | — |
| | | 4704 | 3.8 | 3.3 | 3.2 | 3.0 | 3.0 | 3.0 |
| | | 2411 | 1.8 | 1.9 | 1.8 | 1.7 | 1.6 | 1.6 |
| | | 1189 | 3.6 | 2.0 | 1.7 | 1.5 | 1.5 | 1.4 |

EXAMPLES 10 TO 16

A series of Brookfield viscosity measurements was carried out using the same additives as in Examples 1 to 9 but with a different connate water. This water which again derived from a Texas oilfield contained 75,000 ppm dissolved solids and as well as the predominating sodium and chloride ions also contained lesser amounts of calcium, magnesium, bicarbonate and sulphate ions. The total hardness was 7,900 p.p.m. As the temperature of the well with which this water was associated was approximately 40° C. the viscosity measurements were determined at this order of temperature i.e. 42.8° C. The results are given below:

| Example | Additive | Concentration p.p.m. | Viscosity (centipoise) at sheer rate (sec$^{-1}$) | | | | | |
|---|---|---|---|---|---|---|---|---|
| | | | 1.8 | 3.7 | 7.3 | 14.7 | 36.7 | 73.4 |
| 10 | B | 9300 | 4.6 | 4.2 | 4.0 | 3.7 | 3.6 | 3.6 |
| | | 4773 | 2.4 | 2.0 | 2.0 | 2.0 | 1.9 | 2.0 |
| | | 2395 | 1.6 | 1.5 | 1.3 | 1.3 | 1.2 | 1.2 |
| | | 1336 | 1.6 | 1.4 | 1.2 | 1.1 | 1.0 | 1.0 |
| 11 | D | 9265 | 5.2 | 4.4 | 4.2 | 3.9 | 3.8 | 3.8 |
| | | 4655 | 2.4 | — | 1.6 | — | 1.5 | — |
| 12 | E | 9358 | 47.0 | 46.0 | 45.1 | 44.2 | — | — |
| | | 4599 | 11.6 | 10.0 | 9.5 | 9.1 | 8.8 | 8.1 |
| | | 2245 | 2.4 | 2.0 | 2.0 | 1.9 | 1.7 | 1.7 |
| | | 967 | 1.2 | 1.2 | 1.1 | 1.1 | 1.0 | 1.0 |
| 13 | F | 9767 | 1.4 | 1.2 | 1.2 | 1.2 | 1.2 | 1.2 |
| | | 7555 | 0.8 | — | 1.1 | — | 1.1 | — |
| 14 | G | 9426 | 12.8 | 11.4 | 11.1 | 10.8 | 10.7 | — |
| | | 4767 | 4.2 | 3.5 | 3.0 | 2.8 | 2.7 | 2.7 |
| | | 2365 | 2.0 | 1.5 | 1.5 | 1.5 | 1.4 | 1.4 |
| | | 1130 | 1.4 | 1.2 | 1.2 | 1.2 | 1.1 | 1.1 |
| 15 | H | 9638 | 18.6 | 17.2 | 17.1 | 17.0 | 16.9 | — |
| | | 4755 | 4.8 | 4.2 | 4.0 | 3.8 | 3.7 | 3.7 |
| | | 2274 | 1.8 | 1.4 | 1.4 | 1.4 | 1.3 | 1.3 |
| | | 1132 | 3.2 | — | 1.1 | 1.1 | 1.0 | 1.0 |
| 16 | I | 9227 | 9.0 | 8.6 | 8.3 | 8.1 | 8.2 | 8.2 |
| | | 4765 | 3.2 | — | 2.6 | — | 2.4 | — |

Examination of the figures in Examples 1 to 16 show that the surfactants according to the invention confer a higher viscosity on the solutions in which they are present than do similar surfactants without the requisite 2-$C_1$ to $C_3$-alkyl branching and that the viscosity is also less shear-dependant.

EXAMPLES 17 to 24

Examples 17 to 24 were designed to investigate the effect on the viscosity at constant shear rate of variations in the polyoxyethylene chain length of the sulphated polyoxyethylene alcohol together with variations in the ionic strength of the solution in which the sulphated polyoxyethylene alcohol was used. The alcohol used was the mixture described as D in Examples 1 to 16 and the polyoxyethylene chain was varied between 0 and 7 ethylene oxide units. In every case the sodium salt was used.

The viscosity measurements were made with a Brookfield viscometer at 25° C. and 7.3 sec$^{-1}$. The concentration of surfactant was 5000 ppm by weight and the determinations were made in brine solutions of varying strength up to 26% by weight NaCl. The results are shown in graphical form in the Figure attached to this specification, the symbols shown on the graph having the following significance:

| Symbol | Description | No. |
|---|---|---|
| ⊙ | No. of ethylene oxide units in the sulphated polyoxyethylene alcohol | 0 |
| ■ | No. of ethylene oxide units in the sulphated polyoxyethylene alcohol | 1 |
| △ | No. of ethylene oxide units in the sulphated polyoxyethylene alcohol | 2 |
| ◇ | No. of ethylene oxide units in the sulphated polyoxyethylene alcohol | 3 |
| × | No. of ethylene oxide units in the sulphated polyoxyethylene alcohol | 4 |
| ▽ | No. of ethylene oxide units in the sulphated polyoxyethylene alcohol | 5 |
| ⊗ | No. of ethylene oxide units in the sulphated polyoxyethylene alcohol | 6 |
| + | No. of ethylene oxide units in the sulphated polyoxyethylene alcohol | 7 |

It can be seen from this graph that for maximum viscosity at a given strength of brine there is an optimum ethylene oxide chain length and that as the strength of the brine increases so does this optimum chain length. The systems are single phase until just beyond the viscosity maxima becoming two phase at a brine strength just below the intersection values of the viscosity curves with the abscissa.

We claim:

1. A process for the recovery of oil from a subterranean formation, comprising the steps of: (1) contacting the formation with an aqueous solution or dispersion of a thickening amount of an alkali metal or an ammonium salt of a sulphated polyoxyethylene alcohol comprising an average of one to ten ($CH_2CH_2O$) groups per alcohol group in which at least 40% by weight of the alcohol portion of said sulphated polyoxyethylene alcohol is a $C_8$ to $C_{20}$ primary alcohol having a $C_1$ to $C_3$ alkyl substituent in the 2-position of an otherwise linear chain; and (2) driving the said solution through the formation by water flooding.

2. The process of claim 1 in which the balance of the alcohol portion of the sulphated polyoxyethylene alcohol comprises a linear primary alcohol.

3. The process of claim 1 in which the alkali metal is sodium.

4. The process of claim 1 in which the salt of the sulphated polyoxyethylene alcohol is used in an aqueous solution or dispersion in a concentration up to 5% by weight.

5. The process of claim 1 in which the salt of the sulphated polyoxyethylene alcohol is used in an aqueous solution of greater than 1 wt % salinity.

* * * * *